United States Patent [19]
Schempp

[11] 3,771,365
[45] Nov. 13, 1973

[54] PRESSURE MEASUREMENT APPARATUS FOR PNEUMATIC MATERIAL TRANSPORT LINES

[75] Inventor: Eberhard G. Schempp, Pittsburgh, Pa.

[73] Assignee: Pennsylvania Engineering Corporation, Pittsburgh, Pa.

[22] Filed: Dec. 14, 1971

[21] Appl. No.: 207,822

[52] U.S. Cl............................. 73/395, 55/21, 55/274, 55/431, 55/518, 266/34 T
[51] Int. Cl............................................... G01l 7/00
[58] Field of Search...................... 55/274, 431, 518, 55/21; 210/85, 87, 90, 93; 73/38, 205 R, 213, 395; 116/70, 112; 266/34 T

[56] References Cited
UNITED STATES PATENTS
| | | | |
|---|---|---|---|
| 3,033,030 | 5/1962 | Heller | 73/38 |
| 3,048,039 | 8/1962 | Hackler | 73/395 |
| 3,696,666 | 10/1972 | Johnson et al. | 73/38 |
| 3,266,226 | 8/1966 | Muller et al. | 55/274 |

FOREIGN PATENTS OR APPLICATIONS
| | | | |
|---|---|---|---|
| 1,150,624 | 6/1963 | Germany | 55/518 |

*Primary Examiner*—Bernard Nozick
*Attorney*—Ralph G. Hohenfeldt et al.

[57] ABSTRACT

In a system for measuring the pressure in a conduit or line in which finely divided solids are transported in gas, the single inlet of the primary measuring gauge is connected to the transport line by a tube whose outlet is preceded by a first filter. A differential pressure limit gauge has one inlet connected to the line by a similar filter containing tube and its other inlet connected to the outlet of the first tube so as to measure the pressure drop across the first filter and thereby indicate when either filter may be clogged. The differential gauge produces an alarm signal to indicate filter condition.

13 Claims, 3 Drawing Figures

PATENTED NOV 13 1973 3,771,365

PRESSURE MEASUREMENT APPARATUS FOR PNEUMATIC MATERIAL TRANSPORT LINES

BACKGROUND OF THE INVENTION

In pneumatic transport of gas suspended finely divided dry solids such as alumina, portland cement, flour, burnt lime, fluorspar, pressure indicators such as Bourdon gauges and pressure responsive electrical control switches are often used to monitor and control flow of the materials in a transport line or passageway. Standard pressure responsive devices used in a conventional manner are not reliable in this kind of duty due to plugging and jamming of the sensing elements with fine solid material. This condition exists especially when the transport line or passageway pressure fluctuates in which case the sensing device inlet pressure is alternately rarefied and pressurized so that additional fine material is driven toward the inlet of the device where it accumulates.

One attempted solution to the plugging problem has been to interpose a flexible diaphragm between the pressurized line and a sealed chamber in which the gauge or other sensing device is connected. Diaphragms with the desired properties such as adequate flexibility, abrasion resistance and rupture strength are not readily available and they are expensive. Moreover, a broken diaphragm is sometimes not discovered until the pressure responsive device produces manifestly false readings or becomes completely plugged and damaged.

An example of accurate measurement and control of pressure in pneumatic fine material transport systems being important is in connection with the bottom-blown basic oxygen process for converting molten pig iron to steel. This process involves holding a quantity of molten iron in a refractory lined vessel which has special tuyeres in its bottom. Oxygen and other gases in which fine materials are suspended are injected into the molten metal through the bottom tuyeres in a predetermined sequence. Pressure in the transport line ahead of the tuyeres is an important process variable. Should the pressure drop below a certain minimum level, approximately equal to the static head or weight of the molten metal above the tuyeres, molten metal will flow into the tuyeres and damage them or break out the refractory lining of the converter vessel. Various other process conditions also make it necessary to have accurate pressure measurements, pressure responses and high and low pressure alarms as well.

SUMMARY OF THE INVENTION

A general object of this invention is to overcome the problem of pressure sensing and measuring devices becoming contaminated, fouled, or inactivated in systems for transporting finely divided solids pneumatically.

A further object is to enable effective use of conventional devices for sensing and measuring pressure in fine material pneumatic transport systems.

Another object is to provide for protecting pressure sensing devices with filters and providing means for indicating the condition of the filters and for giving an advance warning of impending plugging so that the harmful effects of plugging can be prevented by a simple maintenance procedure.

Yet another object is to provide means for measuring and sensing pressure which minimizes interruption of the operation of production facilities such as bottom-blown converter vessels by providing reliable, effective and simple measuring apparatus that lends itself to preventative maintenance.

A still further object of the invention is to provide a simple and effective filter for use in connection with new plugging resistant pressure measuring system. gauge An embodiment of the invention is characterized generally by two tubes which are arranged in parallel and have their corresponding inlet ends in communication with the pneumatic transport line that is to be monitored. The opposite corresponding ends of the tubes have filters in them. A gauge which indicates transport line pressure is pressurized through a filter in one of the tubes. A differential pressure gauge is connected across the filter outlets of both of the tubes and this gauge thru connected across the filter outlets of both of the tubes and this responds to the pressure drop differential of the two filters. When gas pressure transmissibility of either of the filters becomes impeded, a pressure differential is sensed and the differential pressure gauge produces a signal which is indicative of this state.

Although the word pneumatic sometimes implies use of air, the word as used herein is intended to be of broader scope and to embrace transport of fine solids with other gases as well.

How the foregoing and other more specific objects are achieved will appear from time to time throughout the course of a more detailed description of an embodiment of the apparatus which will be set forth shortly hereinafter in reference to the drawing.

DESCRIPTION OF A PREFERRED EMBODIMENT

Figure 1:
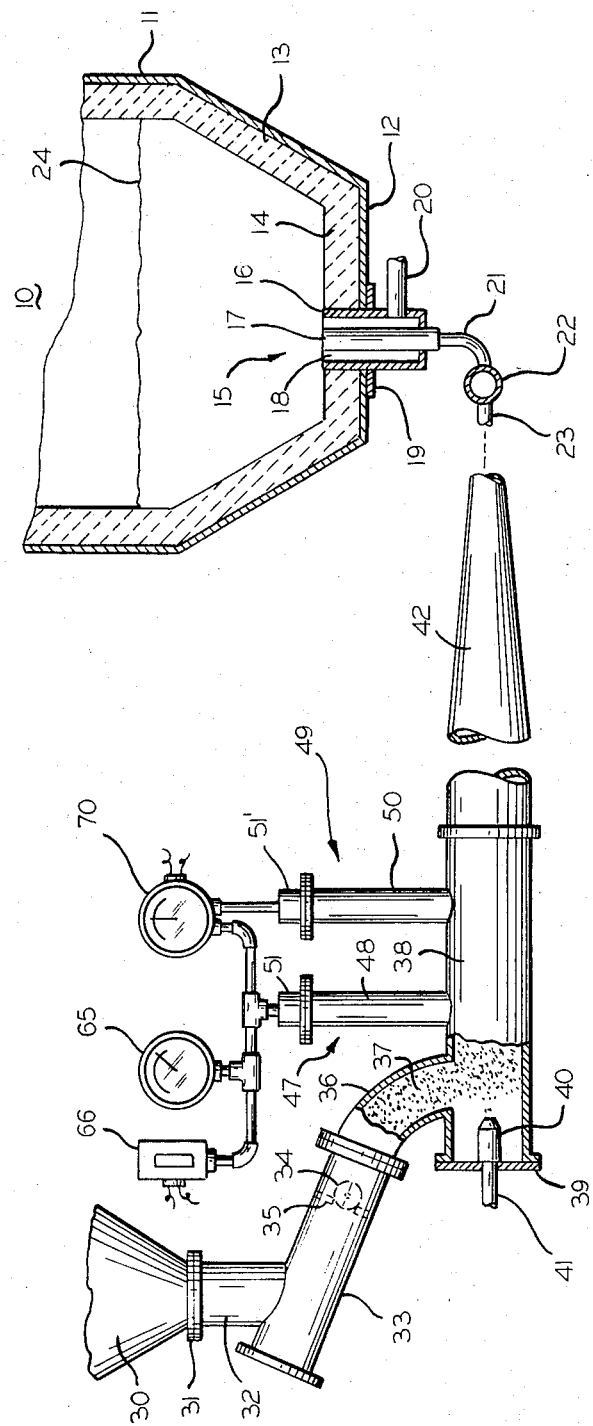
FIG. 1 shows in elevation parts of a fine material containing pressure vessel and a converter vessel fed therefrom through a passageway or line to which the new pressure measuring apparatus is connected.

In FIG. 1 a converter vessel marked 10 is used to exemplify a system in which a gas is used to transport finely divided solid materials from a source of material and pressurized gas. Vessel 10 comprises a metal shell 11 whose interior walls 13 and bottom 14 are lined with refractory material. During operation, vessel 10 is partly occupied by molten metal whose top surface is indicated by the irregular line marked 24. To enable injecting gas and gas in which finely divided materials are suspended into vessel 10, vessel bottom 14 is provided with a plurality of tuyeres which are generally marked 15. The tuyeres are subjected to the hydrostatic pressure of the molten metal during operation of the vessel. Tuyeres of this type are known and may be briefly described as comprising an outer hollow cylinder 16 in which there is a concentrically located hollow cylinder or tube 17. There is an annular space 18 between cylinders 16 and 17. Annular space 18 is open at the top and is supplied with pressurized gas from a pipe 20 that may connect to a source of hydrocarbon gas, not shown. The central cylinder 17 connects by means of a pipe 21 to a header 22 which is in turn fed from a pipe 23 which connects with a source of pressurized gas in which finely divided materials are suspended as will be explained. Generally, in bottom-blown converter vessels there are a number of tuyeres such as 15 arranged along one side of the bottom of the vessel and all of the tuyeres are supplied from the header such as 22.

At the left of FIG. 1 there is a pressure vessel 30 which is shown mostly broken away. Vessel 30 may be occupied by finely divided material such as burnt lime which is to be transported in pneumatic suspension under metered conditions to converter vessel 10. Normally there would be means for fluidizing the powdered materials near the bottom of vessel 10 but these means are not shown since they are known to those who are familiar with the bottom-blown steel conversion process. The means for developing gas pressure within vessel 30 are also not shown.

Pressure vessel 30 is connected by means of flanges 31 to a T-shaped chamber 33 which is also usually equipped with means for developing a fluidized bed of finely divided solids in chamber 33. Shown by hidden lines within chamber 33 is a rotary ball or cylinder valve 34 which cooperates with a gasket or valve seat 35 to regulate the flow of fluidized fine solids out of chamber 33 and into an elbow 36 which intersects with a transport pipe or passageway 38. Pipe 38 is closed at one end by a flange assembly 39 in which a nozzle 40 is affixed. The nozzle is fed by means of a supply pipe 41 which leads back to selectable pressure regulated sources of various gases such as oxygen, nitrogen and argon which are delivered to vessel 10 in connection with the process of converting impure ferrous metal to steel.

Finely divided solids flowing down through elbow 36 are marked 37 and are illustrated by stippling. The fine dry solids 37 enter transport pipe 38 and are propelled by high pressure gas emanating from nozzle 40. The gas, of course, entrains or suspends the fine solid material and transports it in the direction of gas flow which in this case is toward converter vessel 10. Pipe 38 is continuous with a reducing section 42 which is usually near the converter vessel and which connects with feed pipe 23 leading to header 22 and the tuyeres 15. In the illustrated pneumatic transport system, the gas pressure within the piping leading to the tuyeres must always be slightly greater than the hydrostatic pressure head of the melt 24. For instance, if feed gas pressure is too low, molten metal will flow back into central cylinder or nozzle 17 and may destroy it by melting or plugging it. Of course, the hydrocarbon gas which is fed through pipe 20 and annular space 18 must also be pressurized sufficiently to prevent backflow of molten metal into the tuyeres. It is also important to know and to regulate the pressure of the transporting gas accurately in order to carry on the refining process properly.

Figure 2:
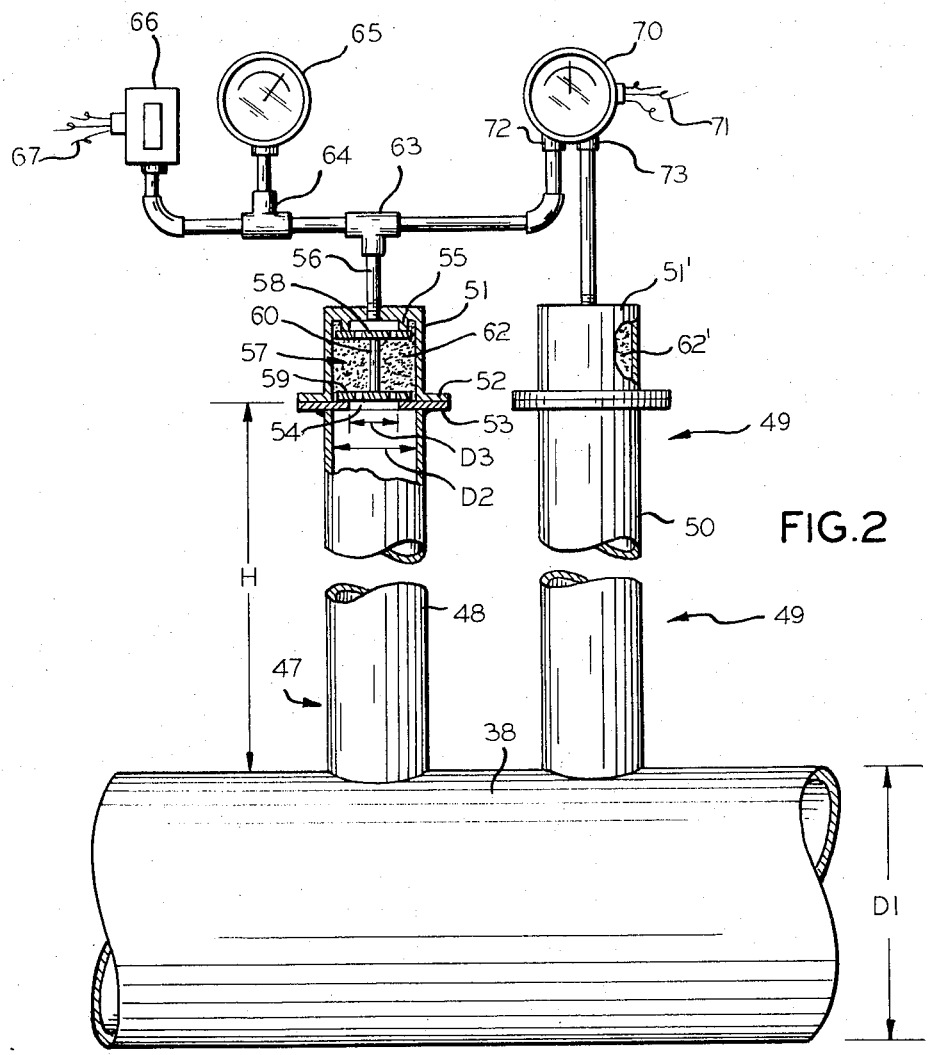
FIG. 2 is an enlarged view of the pressure measuring apparatus associated with the line.

New apparatus for measuring or monitoring the pressure of the transporting gas and suspended fine material is shown generally in FIG. 1 and is shown enlarged and in more detail in FIG. 2. This apparatus will be described primarily in reference to FIG. 2 to which attention is now invited.

In FIG. 2 one may see that pressure measuring and indicating apparatus comprises a pair of parallel and vertical hollow tubular assemblies which are generally marked 47 and 49. These assemblies are substantially alike so that only one of them, 47, will be described in detail. Assembly 47 comprises a pipe or tube 48 whose lower or inlet end connects into transport pipe 38 whose internal pressure is to be measured. The internal diameter of pipe 38 is marked with the legend D1. Tube 48 terminates at its upper end in a flange 53 which is sealingly engaged with a flange 52 that forms part of a cap 51. Flange 53 has a central opening 54 which is also marked with the legend D3 to indicate the diameter of the opening. The internal diameter of tube 48 is marked with the legend D2 and the length of tube 48 between the upper face of its flange 53 and where it intersects with transport pipe 38 is designated with the legend H. The bolts for joining flanges 52 and 53 as well as the intervening gasket for effecting a leak-proof seal between them are omitted from the drawing for the sake of simplification.

Figure 3:
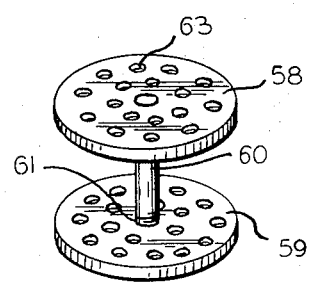
FIG. 3 illustrates in perspective a filter cartridge which is used in the invention, the filter medium being omitted from the cartridge.

Cap 51 is occupied by a filter cartridge which is generally designated by the numeral 57. The filter cartridge comprises a pair of perforated axially spaced disks 58 and 59 which are fastened to opposite ends of a tee rod 60. Disks 58 and 59 together with rod 60 form a spool assembly which is shown enlarged in FIG. 3 where the disk perforations 63 may be seen. One or both of the disks may be threaded onto rod 60 as is suggested by the thread 61 in FIG. 3. In FIG. 2 one may see that the margin of upper disk 58 bears against an annular seat 55 in cap 51 and that the space above this disk communicates with an outlet to which a small pipe 56 is connected.

In FIG. 2 one may see also that spool assembly is packed with a filamentary material 62 which may be what is commonly known as ceramic wool and serves as a filter medium for transmitting gas pressure from transport line 38 to the outlet of cap 51 to which pipe 56 is connected. Filter medium 62 is, of course, subject to being clogged by suspended fine material which rises in tube 48, particularly when there are pressure variations in transport line 38 or in any other passageway to which the tube may be connected.

The pressure in pipe 38 is measured and indicated in this example by a gauge 65 which may be of the Bourdon type. This pressure is transmitted from transport pipe 38 through tube 48, the filter medium in cap 51, pipe 56, Tee 63 and Tee 64 and thence to gauge 65. Also connected to Tee 64 is a pressure actuated switch 66 which may have limit contacts for indicating high and low pressure conditions. Lead wires 67 extend from switch 66 and may be connected to operate pressure limit alarms and other process control devices, not shown. Of course, if the filter medium 62 were relied upon exclusively to prevent finely divided solids from entering gauge 65 and pressure switch 66, the gauge and switch would be vulnerable to being cut off from the pressure in transport line 38 by clogging of the filter as has been experienced heretofore. In accordance with the invention, however, means are provided for indicating the gas pressure transmissibility of the filter medium 62 in cartridge 57 so that it can be replaced before it becomes incapable of transmitting pressure to the instruments 65 and 66.

A differential pressure gauge 70 having limit contacts to which signal conductors 71 are connected is provided for the purpose of indicating the condition of filter media 62 and 62'. Differential gauge 70 has one of its inlets 72 connected to a Tee 63 which leads to the outlet side of filter assembly 57 in cap 51 of tube 48. The other inlet 73 of the gauge 70 connects with the outlet of cap 51' in tubular assembly 49. As mentioned earlier, assembly 49 may be similar or identical to assembly 47. In other words, cap 51' is also occupied by a filter cartridge which has filamentary filter medium 62' as indicated by the broken away portion of the cap 51' shown in FIG. 2. Thus, differential gauge 70 is in equilibrium when filter media 62 and 62' are equally transmissive and subjected to opposing pressures which are transmitted through the respective tubular assemblies 47 and 49 from transport line 38. This equilibrium may be upset, however, as the respective filters become unequally transmissive due to becoming clogged or fouled with finely divided material. In reality, differential gauge 70 measures the pressure drop through the tubular assembly 47 and its included filter medium 62 and makes a comparison with the pressure drop through tubular assembly 49.

To prevent finely divided material from settling or accumulating in tubes 48 and 50 these tubes should be of fairly large size. For instance, the internal diameter D2 of the tubes should be a minimum of one-fourth of the internal diameter D1 of transport line 38. The length of tubes 48 and 50 up to the top surfaces of their flanges 53 is designated by the dimension H. This dimension should preferably be 2 ½ times the diameter D1. Such length would tend to minimize accumulation of finely divided material in the filamentary filter medium 62. D3 is smaller than D2 primarily to prevent filter cartridge 57 from dropping into tube 48 but in any case D3 should not be so small as to act as an orifice which would cause a delay in transmission of pressure variations from the transport line to the gauges or other instruments.

The operating mode of the pressure measuring apparatus is as follows: If filter medium 62 begins to clog, the gauge 65 will indicate low pressure and will not respond properly to pressure variations in transport line 38. Under this condition, differential gauge 70 will sense low pressure on its inlet 72 and will deflect in such direction as to operate contacts which activate an alarm device by means of conductors 71. The alarm indicates that filter 62 is clogged or, at least, less transmissive than filter 62'. If filter medium 62' clogs in excess of medium 62, then, of course, differential gauge 70 will deflect in the opposite direction and operate another set of contacts which will activate an alarm and indicate that this condition exists. If both filter media 62 and 62' clog equally and concurrently, there would, of course, be no pressure differential in the loop which includes differential gauge 70. This condition is avoided by a maintenance schedule which involves changing filter media 62 and 62' alternately. For instance, if the filters each last about two weeks before clogging to the extent that they affect the reading of the gauges, filter 62 may be replaced at the end of the first week of use and at succeeding two week intervals. Filter medium 62' may be replaced at the end of the second week of use and on succeeding two week intervals in which case one or the other of the filter media is certain to be capable of transmitting gas pressure. In any event, if filter 62 becomes sufficiently non-transmissive to affect the accuracy of the gauge 65 or pressure switch 66 measurements, the differential gauge 70 will effect any alarm signal.

Although an embodiment of the new pressure measuring apparatus has been described in considerable detail and in conjunction with a steel converter vessel, it will be understood that such description is intended to be illustrative rather than limiting, for the apparatus may be variously embodied and used in systems for transmitting finely divided or powdered materials from various sources to various consuming devices. Accordingly, the scope of the invention is to be determined only by interpreting the claims which follow.

I claim:
1. Apparatus for measuring pressure in a passageway in which fine solids are transported pneumatically, comprising:
   a. at least a pair of tubular means each having an inlet and an outlet, the inlets being connected to a passageway in which pressure is to be measured,
   b. filter means interposed between the inlet and outlet in each tubular means,
   c. pressure differential sensing means interconnecting the outlets and including means for indicating the pressure differential which may result from either of said filter means being less transmissive than the other, and
   d. pressure indicating means connected to at least one of the outlets to indicate the pneumatic pressure in said passageway which is transmitted through one of said filter means.

2. Apparatus for measuring fluid pressure in a passageway in which fine solids are transported pneumatically, comprising:
   a. first pressure sensing means for indicating the pressure to be measured in said passageway,
   b. first hollow means having a fluid inlet communicating with said passageway and a fluid outlet communicating with said pressure sensing means, and a first filter means in said hollow means between said inlet and outlet to inhibit passing of solids to said sensing means but permit transmission of fluid pressure thereto,
   c. second hollow means having a fluid inlet communicating with said passageway and a fluid outlet, and a filter means in said second hollow means between its inlet and outlet to inhibit passing of solids to said outlet but permit transmission of fluid pressure thereto,
   d. pressure differential sensing means communicating with each of said outlets for indicating pressure differential changes resulting from said filter means becoming differentially clogged whereby to indicate a need for replacement or cleaning of said filter means to obtain effective transmission of fluid pressure to said sensing means for accurate pressure measurement thereby.

3. The invention set forth in claim 2 wherein:
   a. said differential pressure sensing means comprises differential pressure switch means responsive to the pressure differential between said outlets reaching predetermined limits by producing an alarm condition indicative of one filter means being less fluid pressure transmissive than the other.

4. The invention set forth in claim 2 wherein said filter means comprises:
   a. spaced apart perforated disk means,
   b. means connecting one disk means to the other, and
   c. a filter medium comprised of filamentary material packed between said disk means.

5. The invention set forth in claim 2 wherein:

a. said hollow means comprise substantially similar tubular means each of which has means therein holding said filter means at substantially the same distance from said passageway, said tubular means being substantially parallel and vertical.
6. The invention set forth in claim 5 wherein:
a. the internal size of said tubular means is not less than one-fourth the size of said passageway.
7. The invention set forth in claim 5 wherein:
a. the distance between the inlets of said tubular means and the filter means therein is at least two and one-half times the size of said passageway.
8. Apparatus for measuring fluid pressure in a passageway in which fine solids are transported pneumatically, comprising:
a. first filter means having an inlet communicating with said passageway and having an outlet, said filter means being constructed and arranged to transmit fluid pressure between the inlet and outlet and being subject to reduced pressure transmissiveness by solids captured therein,
b. first pressure sensing means responsive to and indicative of fluid pressure transmitted through said filter from said passageway and means communicating said sensing means with said outlet,
c. second filter means having an inlet communicating with said passageway and having an outlet, said second filter means being constructed and arranged to transmit fluid pressure between said last mentioned inlet and outlet and being subject to reduced pressure transmissive by solids captured therein,
d. means for sensing pressure differentials, said last named sensing means communicating with each of said outlets to sense the pressure difference between them that results from variations of fluid pressure transmissiveness of either of said filter means, whereby to provide an indication of when one filter or the other should be replaced to obtain sufficient pressure transmissiveness for either of said sensing means to sense the pressure in said passageway accurately.
9. The invention set forth in claim 8 wherein:
a. said first pressure sensing means comprises a fluid pressure gauge.
10. The invention set forth in claim 8 wherein:
a. said first pressure sensing means comprises a fluid pressure operable switch means.
11. The invention set forth in claim 8 wherein:
a. said differential pressure sensing means comprises a fluid pressure gauge including means for providing a visual indication of pressure differential.
12. The invention set forth in claim 8 wherein:
a. said differential pressure sensing means comprises pressure operable switch means including contact means for controlling electric circuits in response to the relative pressures between said outlets.
13. A method of limiting contamination of a pressure measuring instrument which is adapted to measure pressure in a line for transporting finely divided solids pneumatically, comprising:
a. having at least a pair of filter devices connected to the line, said filter devices transmitting gas pressure and substantially preventing transmission of solids,
b. having a differential pressure indicating device connected to receive the transmitted gas pressure from both of said filter means,
c. having a pressure indicating device that is intended for being responsive to pressure in said transport line connected to receive the gas pressure from one of the filter devices,
d. using the differential pressure indicating device to reveal the difference in gas pressure transmissibility of the filter devices, and
e. alternatingly replacing the filter devices so that both cannot become equally non-transmissive simultaneously so as to prevent existence of a pressure differential.

* * * * *